Patented Nov. 20, 1923.

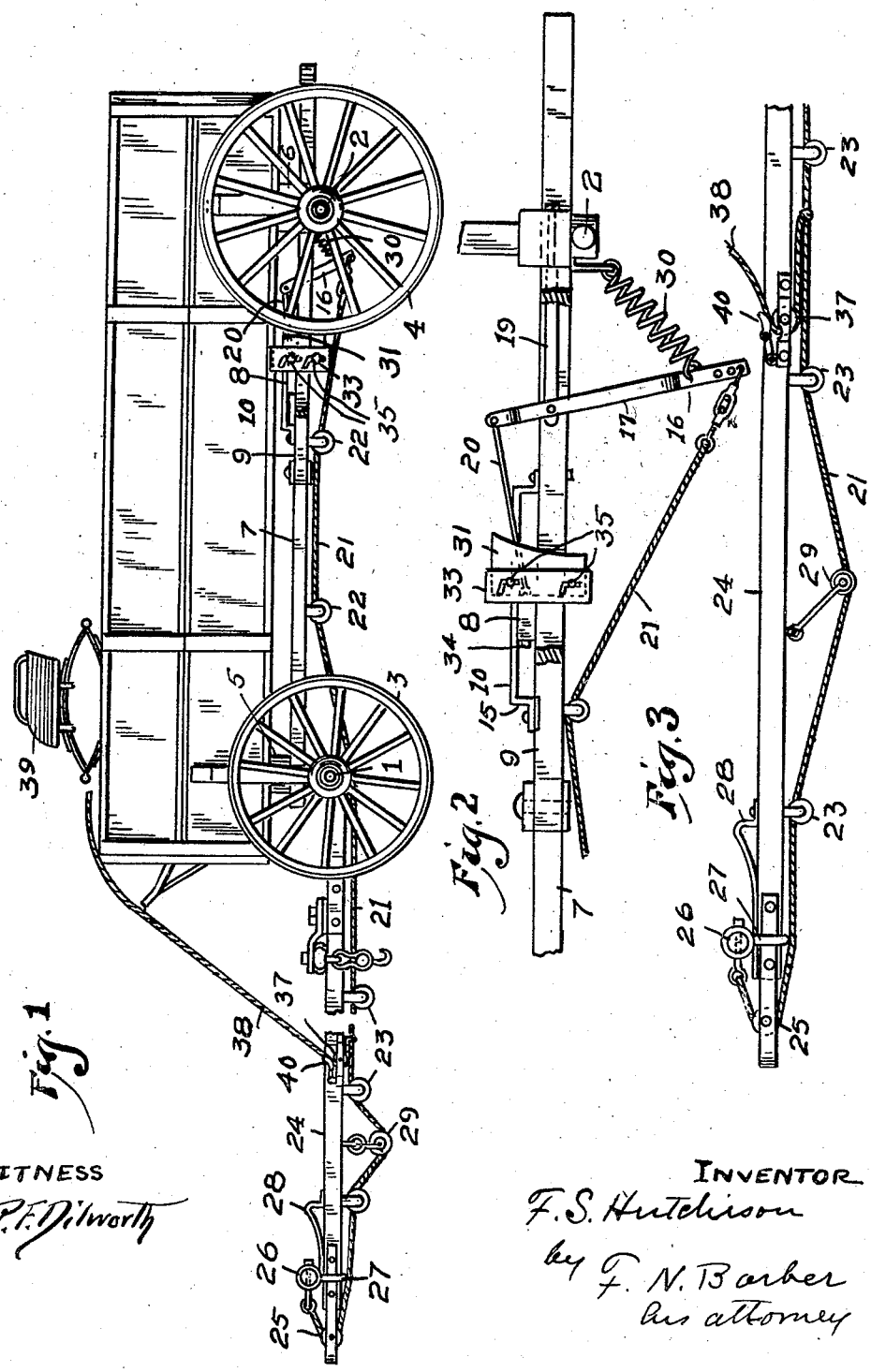

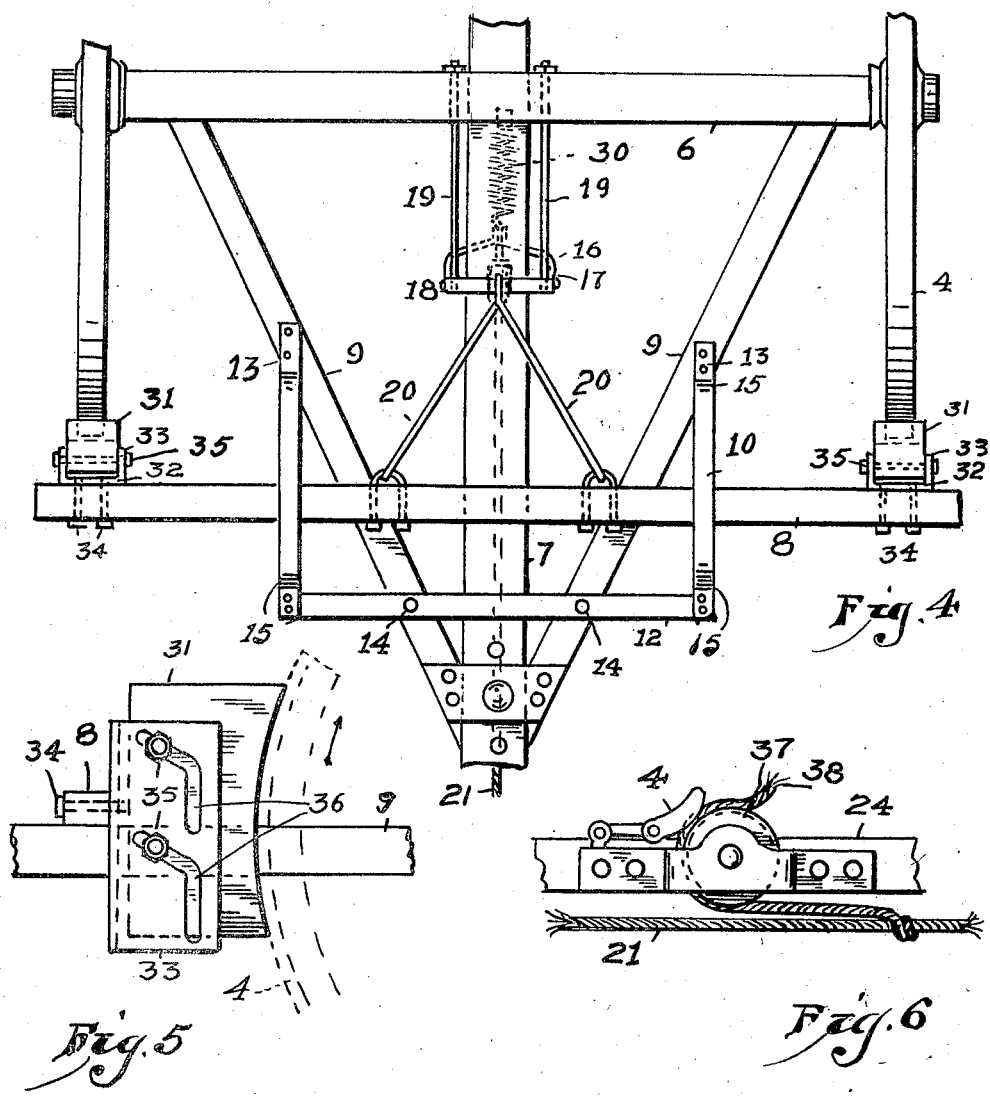

1,475,016

UNITED STATES PATENT OFFICE.

FRANK S. HUTCHISON, OF GARRETTSVILLE, OHIO.

VEHICLE BRAKE.

Application filed December 16, 1921. Serial No. 522,750.

*To all whom it may concern:*

Be it known that I, FRANK S. HUTCHISON, a citizen of the United States, residing at Garrettsville, in the county of Portage and State of Ohio, have invented new and useful Improvements in Vehicle Brakes, of which the following is a specification.

My invention relates to vehicle brakes and operating means therefor.

It is one of the objects of this invention to provide a vehicle brake applied by the draft animals through a cable or the like and other instrumentalities connecting the neck-yoke and the brake-shoes. It is one of the objects to provide a novel means for preventing the braking application of the brake-shoes to the wheels while the draft-animals are backing the vehicle by power applied to the neck-yoke. Another object is to provide a hand-operated means whereby the brake may be applied at any time to lessen the forward speed of the vehicle down grade or to hold the vehicle from backing down grade or to hold the vehicle still when headed down grade. Other objects appear hereinafter.

Referring to the accompanying drawings, Fig. 1 is a side elevation of a wagon provided with my invention; Fig. 2, an enlarged side view of my invention beneath the wagon-box; Fig. 3, a side elevation of the wagon-tongue and the parts of my invention connected therewith; Fig. 4, a plan view of the parts shown on Fig. 2; Fig. 5, an enlarged view of a brake-shoe and parts adjacent thereto; and Fig. 6, a detail side view of a rope-clamp and hand-operated device for actuating the brake-rope or cable.

On the drawing, 1 and 2 designate the front and rear axles of a wagon supported by the front and rear wheels 3 and 4, respectively. The front and rear bolsters 5 and 6 are connected together in a suitable manner by the reach 7.

8 is the brake-beam lying parallel with the rear axle 2 and having its ends somewhat in front of the rear wheels. The beam may be supported on the reach 7 and the braces 9 which extend from the axle 2 or bolster 6 to opposite sides of the reach and is guided by the metal frame members 10 having their rear ends bolted to the tops of the braces 9 at 13. The members 10 extend forwardly over and in contact with the beam and I have their front ends connected to the cross-member 12 which is bolted to the braces 9 at 14. The members 10 are bent downwardly at their ends as shown at 15, to provide space between them and the braces for the movements of the beam backwardly and forwardly.

16 is a vertical lever having lateral members 17 and 18 which lie on opposite sides of the reach and come together at their upper and lower ends substantially in vertical alinement with the center of the reach. The lever 16 stands between the brake-beam and the bolster 6 to which the lateral members are separately connected by the rods 19. The forward ends of the rods 19 are pivoted to the lever 16 somewhat above its center so that the beam, to which the upper end of the lever is connected by the rods 20, may be moved backwards and forwards. The lower end of the lever 16 has secured thereto one end of a cable or rope 21 which extends forwardly over the idle pulleys or sheaves 22 under the reach and the idle pulleys or sheaves 23 under the tongue 24, and thence on the sheave 25 in the end of the tongue to the front side of the neck-yoke 26, to which it is fastened. The neck-yoke has the ring 27 through which the tongue extends. 28 is an inclined stop on the top of the tongue to limit the rearward movement of the neck-yoke. The tongue carries on its under side a rather heavy pendent sheave 29 which rides on the cable to take up slack in the latter.

A spring 30 is connected between the rear bolster 6 and the lower arm of the lever 16 to move the brake-beam forwardly and pull the cable and neck-yoke into normal positions when the brakes are to be released.

A brake-shoe 31 is arranged in front of each rear wheel. Each shoe is carried by a metal housing having the vertical base member 32 from which two spaced lateral members 33 project rearwardly so as to receive between them a brake-shoe 31. The members 32 are connected to the rear edge of the brake-beam by the bolts 34. The brake-shoes each carry two cross-pins 35 which extend through angular slots 36 in the members 32. The lower ends of the slots are substantially parallel to a tangent of the wheel periphery and the upper ends are inclined forwardly from the upper ends of the lower vertical ends. Normally the pins are in the vertical portions of the slots, the spring 30 holding the brake-shoes slightly in front of the wheels 4.

When a span of horses is attached to the wagon in the usual manner and the wagon starts down a grade, the horses hold the neck-yoke back, causing the cable 21 to rock the lever 16 and apply the brake-shoes to the wheels 4, when the wagon reaches a level or up-hill place, the neck-yoke is allowed to move forwardly and the spring 30 returns all the parts to their normal or idle positions. In case the horses pull back on the neck-yoke in backing the wagon, the cable 21 will be operated the same as if the wagon were going down hill, but the movement of wheels 4 is such as to move the brake-shoes upwardly, the pins 35 riding up from the vertical parts of the slots 36 and then forwardly and upwardly in the inclined parts of the slots, whereby the brake-shoes are kept from braking action on the wheels, on which they bear with but the small friction due to their light weights. Upon the forward movement of horses the brake-beam moves forwardly under the action of the spring 30 and the brake-shoes drop to their lower or normal positions. The vertical part of the slots 36 prevents the pressure between the wheels and the brake-shoes from forcing the latter to slide up in the said slots, as they would if the slot was all diagonal. The vertical part of the slots should embrace the pins 35 when the shoes are in braking position, as shown in Fig. 1.

The tongue 24 carries the sheave 37 over the front of which the rope 38 passes, one end being fastened to the cable 21 at the rear of the sheave 37 and the other end extending up to where the driver on the seat 39 may reach it. The sheave cooperates with the weighted dog or catch 40 of well-known construction. When the driver pulls on the rope 38, he causes the brake-beam to move rearwardly toward braking position. By pulling the rope 38 he can set the brakes under all conditions even though the wagon is stopped going up grade, for he can cause the brake blocks to engage the wheels though the pins 35 are at the top of the inclined portions of the slots 36. When the rope 38 is pulled it lifts the catch so as to let the rope run rearwardly and it always lets it run forwardly. When the driver slackens the rope as shown in Fig. 6 the catch 40 clamps it to the pulley and holds it until it is released by the driver again lifting it by straightening the rope.

I claim—

1. In combination with a wagon adapted to be operated by draft-animals and having a tongue, a neck-yoke, a brake-beam carrying brake-shoes in front of the rear wheels, an upstanding lever carried by the wagon, an operative connection between the lever and the brake-beam, flexible connection running from the lever and across the forward portion of the tongue and connected to the neck-yoke, and a pendent pivoted take-up for the flexible connection between the latter and a portion of the wagon.

2. In combination with a wagon adapted to be operated by draft-animals and having a tongue, a neck-yoke, a brake-beam carrying brake-shoes in front of the rear wheels, an upstanding lever carried by the wagon, an operative connection between the lever and the brake-beam, a flexible connection running from the lever and across the forward portion of the tongue and connected to the neck-yoke, means for returning the brake mechanism to idle position when released at its braking position, and a take-up for the slack of the flexible connection.

3. In combination with a wagon adapted to be operated by draft-animals and having a tongue, a neck-yoke, a brake-beam carrying brake-shoes in front of the rear wheels, a lever carried by the wagon and connected to the brake-beam, a flexible connection between the lever and the neck-yoke, means for returning the brake mechanism to idle position when released at its braking position, and means for taking up the slack of the flexible connection.

4. In combination with a wagon adapted to be operated by draft-animals and having a tongue, a neck-yoke, and a brake-beam carrying brake-shoes in front of the rear wheels, a lever carried by the wagon and operable by the neck-yoke and connected to the brake-beam, and a pin and slot connection between the brake-beam and the brake-shoes, the slots being formed to guide the brake-shoes first substantially parallel to a tangent of the wheel periphery and then away from the wheel, when the brake-shoes are applied to the said wheels by the backing of the draft-animals.

Signed at Garrettsville, Ohio, this 14th day of December, 1921.

FRANK S. HUTCHISON.